United States Patent

[11] 3,576,550

| [72] | Inventor | Donald James Behymer<br>3201 43rd Ave. So., Minneapolis, Minn. 55406 |
|---|---|---|
| [21] | Appl. No. | 831,442 |
| [22] | Filed | June 9, 1969 |
| [45] | Patented | Apr. 27, 1971 |

[54] ELECTROCHEMICAL RECORDING DEVICE
4 Claims, 2 Drawing Figs.

[52] U.S. Cl. .................................................. 340/173, 204/5
[51] Int. Cl. .................................................. G11c 13/02

[50] Field of Search .................................................. 340/173

[56] References Cited
UNITED STATES PATENTS 3,249,724  5/1966  Hurvitz .............................. 340/173

*Primary Examiner*—Terrell W. Fears
*Attorney*—L. A. MacEachron

ABSTRACT: An electromechanical recording device having plural electrodes and a moving electrolytic bubble in a capillary tube that stops acting before reaching an irreversible condition and a comparing recording circuit using it.

PATENTED APR 27 1971

3,576,550

INVENTOR.
DONALD JAMES BEHYMER
BY L. A. MacEachron
ATTORNEY

ELECTROCHEMICAL RECORDING DEVICE

BACKGROUND OF THE INVENTION

The concept of an electrochemical recording device is very old as represented by the patent to Wright, U.S. Pat. No. 702,844 wherein the basic chemistry and functioning of his device is admitted to be old and his invention consists in making a practical device. The most common form of electrochemical recording comprises transferring liquid metal by electroplating from one side of a bubble of electrolyte to the other. This is done within a confining tube or vessel. The vessel is calibrated to show the integral of the electroplating current flow as a result of the change in the mass of liquid metal on one side of the electrolyte bubble as compared to the other. As a practical matter the liquid metal has usually been mercury.

A modern version of this type of recording measuring device is revealed in Corrsin, U.S. Pat. No. 3,045,178. A shortcoming of this art reference structure is the fact that it can be operated to a point of no return. My invention includes providing a means for preventing such operation to an irreversible condition.

The U.S. Pat. No. 3,427,539 Mann, shows structure that might have been used in the manner of my invention but which was not. It does, however, describe and offer a solution to production difficulties encountered in making devices according to the Corrsin disclosure.

The foregoing art also comprises the art known to me which most nearly suggests what I have done. As a matter of fact, I did not know of Mann until after I had made my invention, but I find no teaching in Mann to do what I am here disclosing and claiming as my invention.

SUMMARY OF THE INVENTION

This invention is an electrochemical recording device of the general type in which a liquid metal, most commonly mercury, is contained within a tube of transparent dielectric material, such as glass, with a bubble of electrolyte separating the mercury into two parts. In each end of the tube is sealed a conducting electrode that extends into the interior of the tube and so contacts the mercury. My invention requires a second pair of electrodes short of each end of the tube or intermediate the two end electrodes. The second pair of electrodes are also sealed into the wall of the tube. A source of voltage differential is applied to one of the intermediate electrodes and the more remote therefrom of the two end electrodes. The voltage thus applied causes a flow of current through the device in a manner that causes what may be termed plating of the mercury from the mass associated with the intermediate electrode to that contacted by the end electrode. As the mass associated with the end electrode increases, the bubble of electrolyte is forced in the direction of the intermediate electrode and past it until the mercury finally reaches in an unbroken column from the end electrode to the intermediate electrode. As soon as that happens, the voltage differential is shunted and so equalized. With no voltage difference, of course, current flow stops which stops the plating action. At this time the device has either recorded fully or has been reset to zero. In either case, the other electrodes are then employed to either record or to reset the instrument to a zero setting, as the case may be.

For the device to operate as intended, the intermediate must be narrower than the electrolyte bubble. Otherwise, the intermediate electrode could bridge the electrolyte bubble with the result that, while the device would automatically stop before the bubble of electrolyte passed entirely to one end of the tube, the electrodes would also be connected to each other so as to be permanently shunted in both directions and hence unable to be reset as in Corrsin.

With the exception of the intermediate electrodes, the type of action used is that described by Corrsin in U.S. Pat. No. 3,045,178. The invention here disclosed includes the extra electrodes and the use of the end alternately with the remote intermediate electrode in each case.

A specific use of the device described above is also part of this invention in which the length of time that a specific physical phenomenon occurs is recorded. In this circuit, a transducer that translates any physical phenomenon into an electrical signal, for example a microphone, is used to produce an electrical signal which is compared to a reference or standard and if of a value that is of interest, is used to produce a current flow through the recording device to cause migration of the liquid metal to record that a signal of interest was imposed for a period of time causing the shown quantity of mercury to migrate. This in turn is measured against a predetermined scale to show time.

By the use of appropriate filters, a number of different signals of interest may be recorded as they occur. For example sounds of different levels and/or frequency may be selected and compared to a predetermined standard signal. Those which are above one value but below another are recorded on one recording device and second device will record a different level and/or spectrum of signal. The invention is disclosed in detail below by reference to the accompanying drawings which are briefly described as follows:

DETAILED DESCRIPTION OF THE INVENTION

Figure 1:
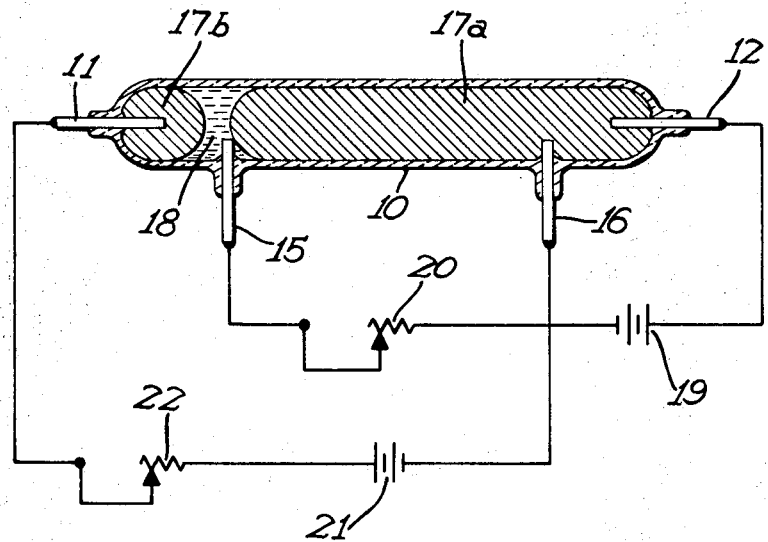
FIG. 1 is a cross-sectional and schematic representation of the recording device.

Referring to FIG. 1, the indicator is housed in a transparent dielectric tube 10 into the ends of which are secured in sealed relation the electrodes 11 and 12. Similarly sealed in the tube wall are the intermediate electrodes 14 and 15. Two portions of liquid metal 17a and 17b are separated from each other by the electrolyte bubble 18. A source of electrical energy 19 regulated by a suitable control 20 causes the liquid metal to migrate from 17a to 17b. A separate source of electrical energy 21 suitable controlled as at 22 causes the metal to migrate from 17b to 17a. In each instance, when the metal has migrated sufficiently to produce a connection between an end electrode and its paired intermediate electrode, as in the case in FIG. 1 between electrode 12 and electrode 15, the potential difference between the electrodes is shorted out and so looses its ability to produce current flow and metal migration. Notice that electrode 15 is substantially narrower than the thickness of the electrolyte bubble 18. As electrodes 15 and 16 are alike, it is clear that this same thickness relationship pertains when the condition of the device is reversed from that shown in FIG. 1.

Figure 2:
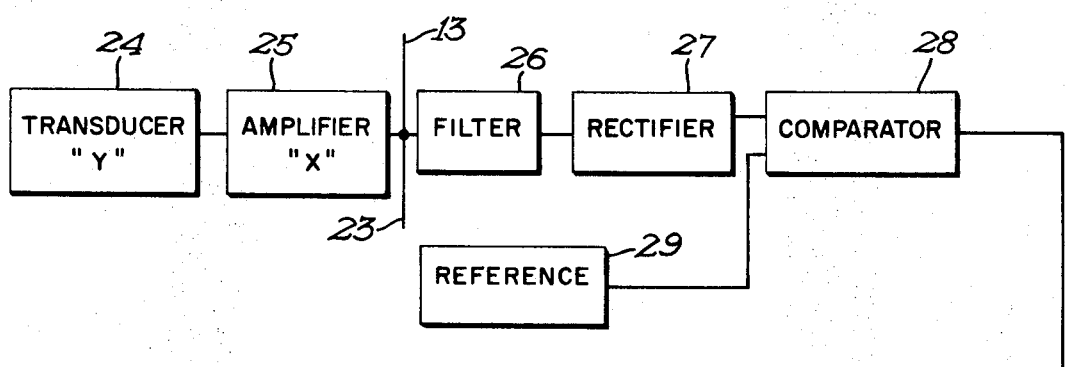
FIG. 2 is a schematic representation of the comparing circuit by means of which desired signals are separated and recorded while undesired signals are ignored.
Figure 2:
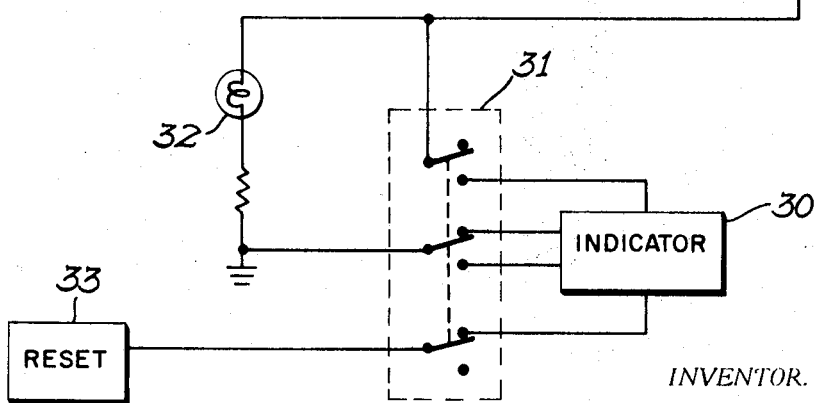

Turning to FIG. 2, a suitable transducer 24 for whatever physical phenomena it is desired to record, as for example a microphone in recording sounds, feeds its signal into a suitable amplifier 25. The amplified signal is screened through a filter 26. Filter 26 will be set to admit only signals within a range that is of interest. The filtered signal is then rectified as at 27 and directed to a comparator 28 which is also receiving a reference signal from a reference signal generator 29. When the rectified signal is greater than the reference, the signal is passed or serves to pass activating current to the recording device 30 via the triple pole, double throw switch 31. As long as the incoming signal is greater than the reference, the recording device is actuated and migration of the mercury takes place. In this way the total time that a sound level, or more accurately, a sound pressure level (SPL hereafter) above a predetermined reference occurs is recorded. The signal line from the amplifier may, of course, be applied to a number of different filters and references as shown by branch leads 13 and 23. Branch leads 13 and 23 would each be connected to its own comparator and reference signal generator. Thus a number of different sound frequencies and/or intensities that may occur at the point of location of transducer 24 can be recorded. If desired, a lamp 32 may be inserted in the recording circuit to light up whenever the system is recording sound above the level of the reference. Thus an effective meter may be constructed to record the amount of time during a test period that the SPL exceeds several different SPL's as would probably be necessary to determine if one were meeting the requirements of the proposed Department of Labor Standard on safety as to noise regulation. It is proposed that a decibel level of 85 (A scale) continuous or equivalent be the maximum permissible. Thus higher values for shorter periods of time would be equal to continuous at 85 decibels (A scale). By use of the proposed meter, and accurate picture of the daily sound level in a factory could be recorded with precision.

Whenever the test periods are over or the device has recorded to its maximum potential, i.e. until the mercury shunts across the two electrodes being used to record, it may be reset to zero by sending current in the opposite direction through the electrolyte. This is accomplished by turning the triple pole, double through switch in the direction which will connect the reset circuit to the appropriate terminals of the recording device. The voltage differential used at this time is that which will produce the most rapid migration of mercury without producing possible injury to the device as by causing it to overheat or otherwise produce some chemical breakdown of the materials used. The reset circuit is represented by the block so labeled and numbered 33.

While my device, at least in the manner in which it is used, is both absolutely novel and not suggested even by the prior art, all of the techniques for making the various elements are revealed in Corrsin and Mann mentioned above. Similarly, once the concept of my comparing and recording circuit is disclosed, most skilled in the art could assemble the circuit from existing components. For this reason, I have not discussed the structure of individual units nor shown in detail the wiring diagram for the comparing circuit shown as the specific manner in which the device could be employed.

Furthermore, although I have disclosed, as a specific example of the use of my device, a meter recording the integral of SPL and time, it is clear it can be similarly used in other context. Accordingly, I define my invention as required by statute in the following claims.

I claim:

1. An electrochemical recording device of the type having a liquid metal contained within a transparent, dielectric tube and the liquid metal being separated into two portions by a bubble of electrolyte, said tube having electrodes sealed in its wall and extending into the interior of the tube; whereby a current may be caused to flow from one electrode to the other through the liquid metal and electrolyte to cause migration of the liquid metal from one side of the electrolyte bubble to the other to produce a recording effect as a result in the changes in the relative amounts of liquid metal on opposite sides of the electrolyte bubble; the improvement comprising: a second pair of electrodes sealed in the wall of and extending to the interior of the tube intermediate the first electrodes, and means for applying recording voltage across one of the intermediate electrodes and the more remote therefrom of the first mentioned electrodes and alternately across the other intermediate electrode and the first mentioned electrode most remote from the other intermediate electrode a resetting voltage, said intermediate electrodes being narrower than the electrolyte bubble.

2. The device of claim 1 in which the means for applying recording voltage is a transducer coupled to an amplifier, filter, rectifier and comparator and a reference signal generating device also coupled to the comparator, whereby only selected signals record.

3. The device of claim 2 in which the amplified signal is coupled to a plurality of filters, rectifiers, comparators, reference generators and recording devices; whereby a plurality of different selected signals are recorded.

4. The device of claim 3 in which the transducer is a microphone.